United States Patent [19]

Green

[11] 4,304,477
[45] Dec. 8, 1981

[54] THREE DIMENSIONAL CAMERA HAVING LENTICULAR SCREEN MOVING APPARATUS

[75] Inventor: James A. Green, Mars, Pa.

[73] Assignee: Nicholas C. Terzis, Pittsburgh, Pa.; a part interest

[21] Appl. No.: 135,812

[22] Filed: Mar. 31, 1980

[51] Int. Cl.³ .................... G03B 35/00; G03B 17/26
[52] U.S. Cl. ................................ 354/112; 354/276
[58] Field of Search .............. 354/112, 114, 115, 121, 354/122, 123, 276, 278, 279

[56] References Cited

U.S. PATENT DOCUMENTS

| | | | |
|---|---|---|---|
| 1,788,645 | 1/1931 | Velten | 354/121 |
| 3,301,154 | 1/1967 | Stewart et al. | 354/112 |
| 3,503,316 | 3/1970 | Takano et al. | 354/112 |
| 4,107,712 | 8/1978 | Law | 354/115 |
| 4,109,261 | 8/1978 | Law | 354/112 |
| 4,109,262 | 8/1978 | Law | 354/112 |
| 4,125,849 | 11/1978 | Law | 354/112 |
| 4,213,695 | 7/1980 | Ely | 354/276 X |

*Primary Examiner*—Donald A. Griffin
*Attorney, Agent, or Firm*—Richard J. Sher

[57] ABSTRACT

A photographic camera for three-dimensional photography has a housing which includes an opening to the interior on a forward side thereof and an aperture moveable transversely across the opening for selectively admitting light rays through the opening. Within the housing are located optical means for focusing the light rays along an optical path to a location adjacent the rearward side of the housing. At the rearward side of the housing there is located mechanical means for moving a planar object synchronously and in the same direction with the aperture. The improvement comprises an assembly for permitting the camera to accept a large number of film sizes and formats loaded in removeable, light-tight film holders. The assembly is especially useful in adapting the camera for use with Polaroid-type film. The assembly includes a sliding frame which is attached to the mechanical movement means of the camera for synchronous movement with the aperture. The sliding frame includes attachment means which are adapted to removeably secure a lenticular screen frame either in the vertical or horizontal format. A back member attached to the camera housing for selective closure of the rearward side of the housing includes spring means for urging a film holder, preferably of a conventional instant-developing type, toward the rearward side of the lenticular screen such that the photosensitive film will be immoveably held against the lenticular screen as the screen moves along with the sliding frame as required for proper operation of the camera. The assembly is designed to allow the creation of three-dimensional pictures in either the vertical or horizontal format.

12 Claims, 4 Drawing Figures

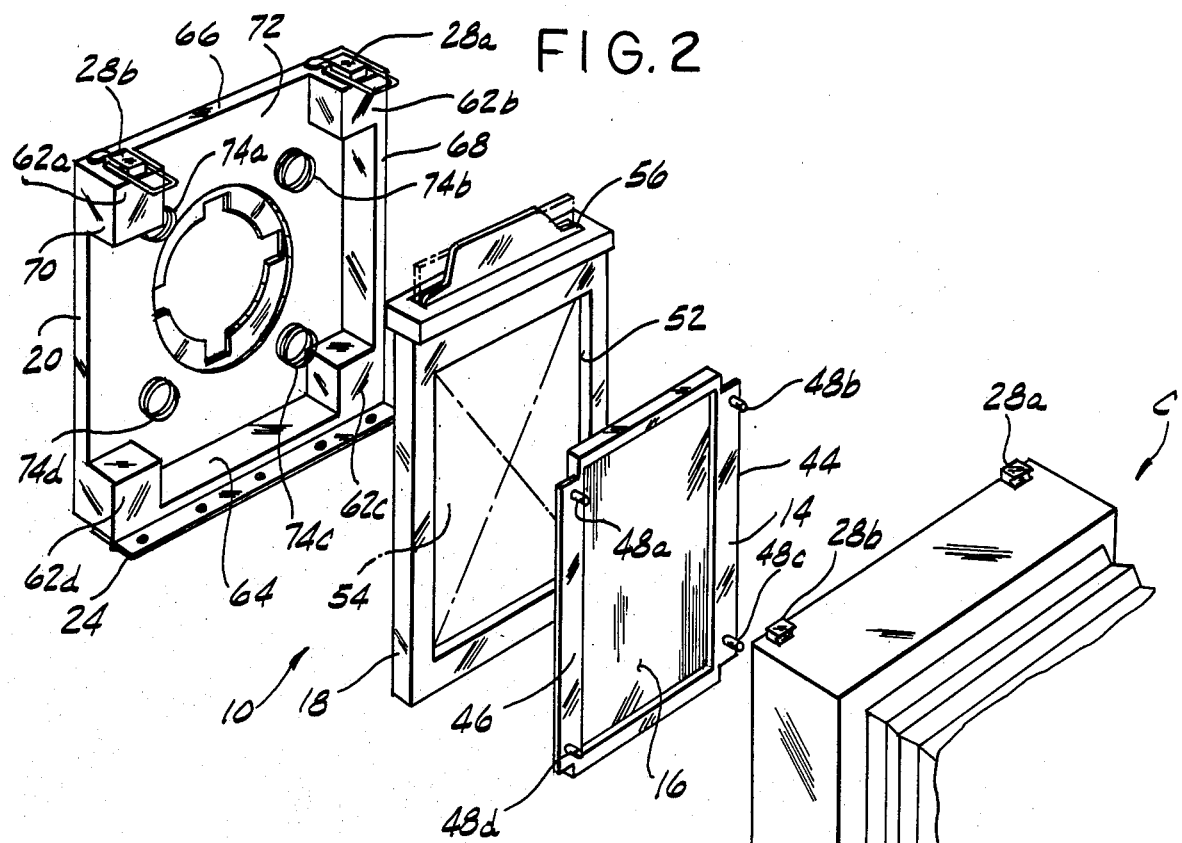
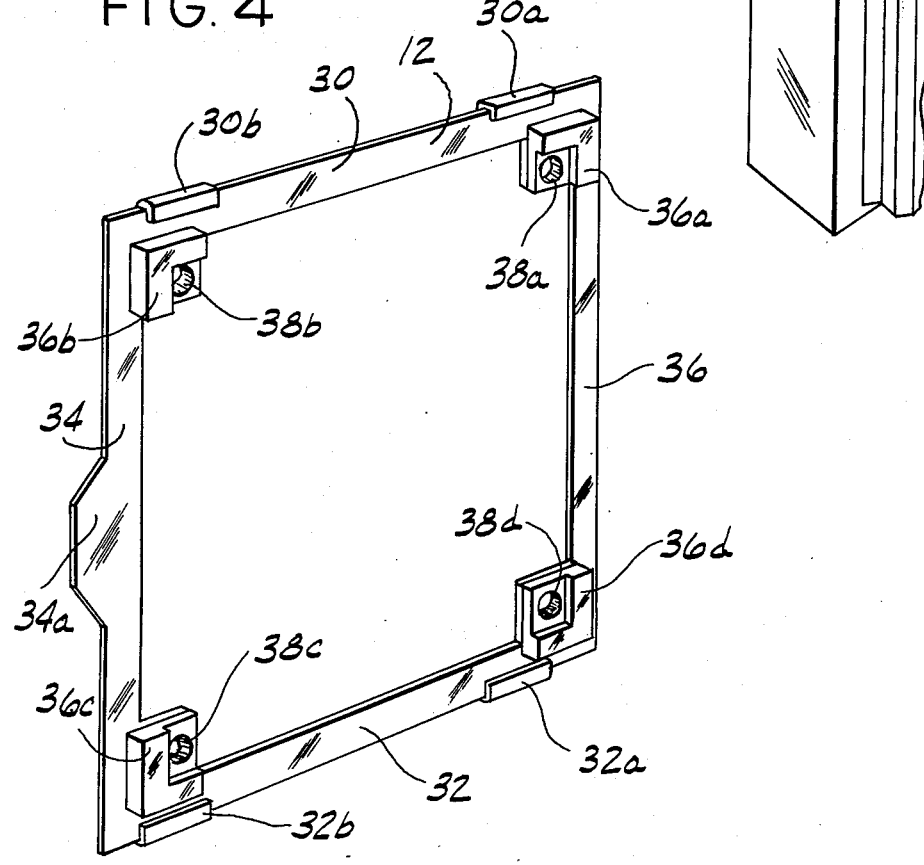

THREE DIMENSIONAL CAMERA HAVING LENTICULAR SCREEN MOVING APPARATUS

BACKGROUND AND SUMMARY OF THE INVENTION

The present invention relates to an assembly or kit which may be used to modify a particular type of three-dimensional photographic camera which utilizes a moving lenticular screen. After modification, the camera will accept alternative film such as Polaroid-type instant developing film. The particular type of camera for which the present invention is useful is described in a plurality of U.S. patents which have issued to Chi Y. Law. They are U.S. Pat. No. 4,107,712 issued Aug. 15, 1978 and entitled "Camera for Taking Three Dimensional Photographs Having Screen Moving Means;" U.S. Pat. No. 4,109,261, issued Aug. 22, 1978, and entitled "Camera for Taking Three Dimensional Photographs;" U.S. Pat. No. 4,109,262, issued Aug. 22, 1978, and entitled "Three Dimensional Camera Having Lenticular Screen Moving Apparatus;" and U.S. Pat. No. 4,125,849, issued Nov. 14, 1978, entitled "Three Dimensional Camera Having a Film Holder." The disclosures of the above identified U.S. patents are hereby incorporated within the present disclosure by reference thereto.

For convenience, a short explanation of the operation of the camera disclosed in the above patents follows:

The three-dimensional camera, on which the present invention is an improvement, includes a housing having an opening to the interior on a forward side thereof. An aperture within the housing is moveable transversely across the opening for selectively admitting light rays through the opening as the aperture travels across same. A lens structure in the housing projects the rays of light along an optical path to a lenticular screen located at the rearward of the housing and having parallel, vertical, etched lines on the forward side thereof. A film holder in the housing urges a photosensitive photographic film against the rearward side of the lenticular screen and while the film is held immoveable, the lenticular screen is caused to move, by mechanical means, synchronously and in the same direction as the aperture. As described in the patents referred to hereinabove, the resultant exposure of the film will provide an image which when developed and viewed through a similar lenticular screen will provide the illusion of a three dimensional photograph.

While a camera operating under the principles of the disclosure of the referenced patents has proven to be successful, it is a drawback of the device that it can only be utilized with standard sheet film which must be secured via double-sided ashesive tape within the film holder of the camera. Instant-developing type film cannot be utilized successfully without supporting the edges thereof by a properly sized film holder. Also, the film must be secured within the camera such that the film is not exposed to light during the loading process. This can be inconvenient and awkward.

The present invention relates to a novel assembly or kit which can in a facile manner be attached to the mechanical means of the Law camera to increase the versatility of the camera such that three-dimensional photographs may be taken on many different sizes of film in either the vertical or horizontal format using instant-developing type film such as standard Polaroid sheet film. Any type of film may be loaded into a light-tight film holder of proper size prior to the loading of the film holder into the camera, thus providing the advantage of being able to load the three-dimensional camera in the light.

The assembly according to the present invention includes a sliding frame which is connected to the mechanical moving means of the camera, which mechanical means would normally be connected to the original lenticular screen. The sliding frame is mounted in the camera in the same fashion as was the original lenticular screen and therefore will move synchronously and in the same direction as the camera aperture as was described above with respect to the original lenticular screen. The assembly also includes a lenticular screen frame which is sized to accommodate a lenticular screen of the dimensions suitable for making three-dimensional photographs on a desired film which has been loaded in a removeable sheet film holder. The lenticular screen frame is provided with attaching structure which engage mating attaching structure formed on the sliding frame. A back member replaces the original back of the camera and is attached to the camera housing for selective closure of the rearward side thereof and retains the removeable film holder in either the vertical or horizontal format. Spring means on the back member urge the film holder and the film therein with even force against the new lenticular screen of the assembly. In the preferred form, the lenticular screen and the back member of the improved assembly are sized to accommodate a Polaroid-type film holder which is readily available on the market. The film holder is modified by attaching to the rearward side thereof a locking device which cooperates with the back member to prevent the film from contacting the lenticular screen until such time as the assembly is ready for the exposure of the film. Further, a slide plate in the film holder protects the film from exposure to light until after the film holder is loaded into the camera and thereafter the slide plate is removed.

It is therefore the main objects of the invention to improve upon the conventional lenticular-screen type, three-dimensional camera by providing an assembly, which when attached to the rear of the camera, will permit greater versatility of the camera in that it may thereafter be utilized with many different-sized instant-developing type films in either the vertical or the horizontal format, and may be utilized with any film in a film holder which protects the film from exposure until the film is safely positioned within the camera.

BRIEF DESCRIPTION OF THE DRAWINGS

These as well as other objects and advantages of the present invention will become more apparent upon a reading of the following detailed description of a preferred embodiment thereof, in conjunction with the drawings wherein:

FIG. 2 is an exploded schematic view showing the forward side of the invention;

FIG. 4 is a perspective rearward view of the sliding frame of the invention.

DETAILED DESCRIPTION OF THE PREFERRED EMBODIMENT

Figure 1:
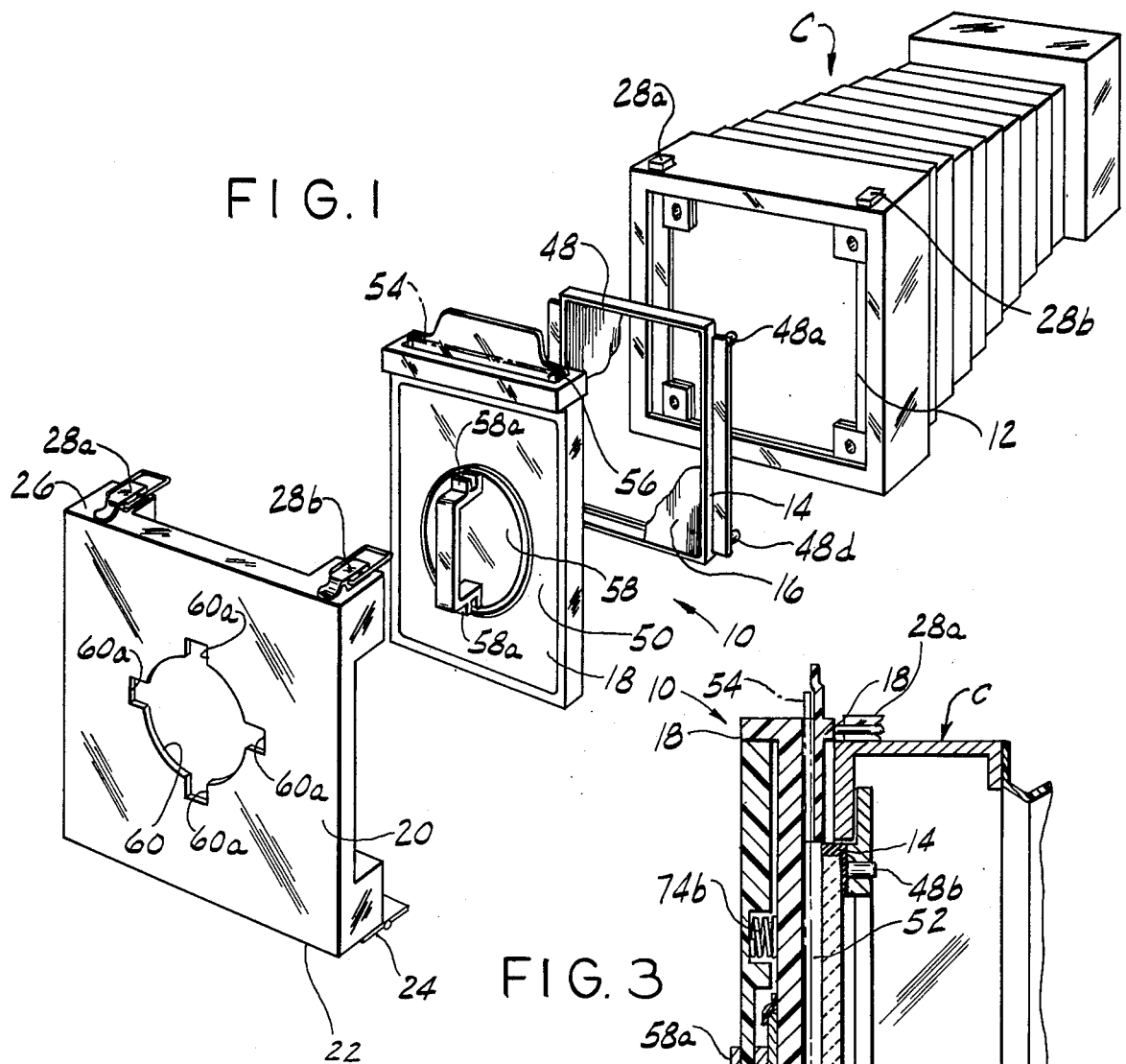
FIG. 1 is an exploded schematic view of the rearward side of a three-dimensional camera incorporating a preferred form of the improvement of the present invention.
Figure 3:
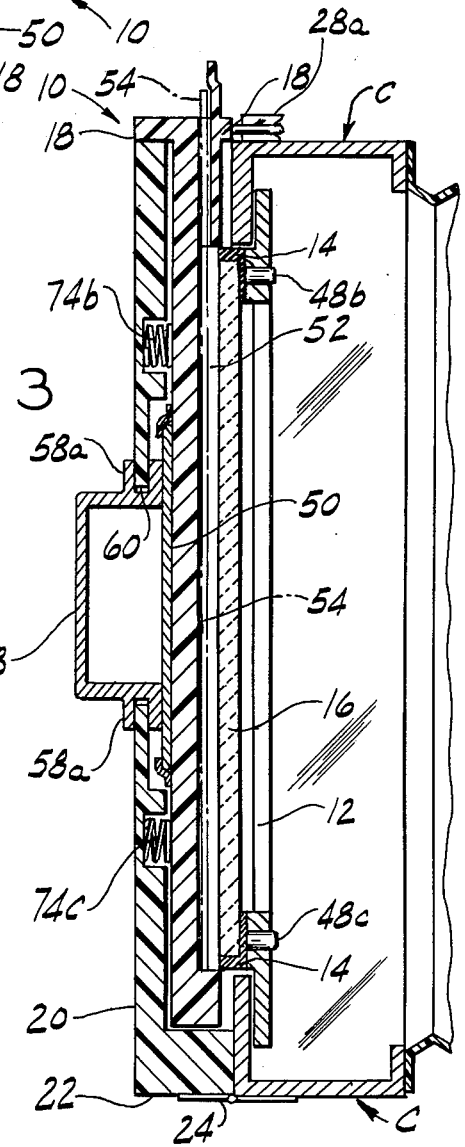
FIG. 3 is a schematic cross sectional side view of the assembly as utilized with the camera.

With reference to the drawings and FIGS. 1 and 2 in particular, there is shown in schematic form an assembly or kit 10 which is used to modify a three dimensional photographic camera C (only partially shown). Camera C is of the type developed by Chi Y. Law and which is described in detail in the patents referred to hereinabove. Camera C includes a mechanical means (not shown) which during exposure of photographic film moves a lenticular screen synchronously and in the same direction as the movement of the camera aperture (not shown) in order to produce a three dimensional photograph as described in the referenced patents.

Assembly 10 is generally comprised of a sliding frame 12, a lenticular screen frame 14, carrying a lenticular screen 16 therewithin, a sheet film holder 18, and a back member 20. The bottom edge 22 of back member 20 is hinged to the bottom edge of camera C by means of hinge 24, and the top edge 26 of back member 20 is selectively and releasably connected to the top edge of camera C by means of suitable securing locks 28a and 28b portions of which are attached to the top edge of camera C. When in the closed position, back member 20 encloses with camera C, sliding frame 12, lenticular screen frame 14, and film holder 18.

Sliding frame 12 is of rectangular shape, being substantially square, and has upper and lower horizontal portions 30 and 32 (FIG. 4) and vertical side portions 34 and 36. Vertical portion 34 is provided with an integral outwardly extending tab portion 34a. Sliding frame 12 is of the precise size and shape as the frame (not shown) which held the lenticular screen which was originally included in camera C. Therefore, one skilled in the art will be able to remove the lenticular screen which was provided as original equipment in camera C and will be able to readily replace same with sliding frame 12, whereby the mechanical means in camera C may be connected to tab portion 34a of sliding frame 12. Further, brass channels 30a and 30b slidingly engaging top portion 30, and brass channels 32a and 32b slidingly engaging bottom portion 32 of sliding frame 12 will readily seat within the already existing grooves (not shown) of camera C, to allow the same horizontal sliding movement of frame 12 with respect to camera C as that previously enjoyed by the original lenticular screen provided with the camera. Therefore, it can be seen that when sliding frame 12 is properly substituted for the original lenticular screen of camera C, sliding frame 12 will move synchronously and in the same direction as the camera aperture as was described hereinabove with respect to the original lenticular screen of camera C. Sliding frame 12 also includes at each corner thereof, lenticular screen frame connecting means 36a, 36b, 36c and 36d. Each of the connecting means 36a, 36b, 36c and 36d includes a rearwardly facing bore 38a, 38b, 38c, 38d respectively.

As shown in FIG. 2, lenticular screen frame 14 is provided with vertical side pillars 44, 46, carrying a rearwardly projecting frame 48 therebetween. At the upper and lower extremity of each pillar 44, 46 are cylindrical posts 48a, 48b, 48c and 48d which are sized and positioned to snugly fit within bores 38a, 38b, 38c and 38d respectively, of sliding frame 12. After posts 48a, 48b, 48c and 48d are positioned within the respective bores 38a, 38b, 38c and 38d, the frictional engagement therebetween is sufficient to secure lenticular screen frame 14 onto the rearward side of sliding frame 12 for movement therewith. Frame 48 is formed of any rectangular shape having vertical and horizontal dimensions which are equal to or smaller than the respective dimensions of sliding frame 12; therefore, lenticular screen 16 held within frame 48 may be of the proper size to accomplish three-dimensional photography on any desired film format as long as the film size is not greater than the film size designed to be used with the original lenticular screen of camera C. In the preferred embodiment shown in the drawings, frame 48 and lenticular screen 16 are dimensioned to be utilized with a conventional Polaroid-type film holder 18 in the vertical format. If utilized in the horizontal format, lenticular screen frame 14 would be provided with horizontal upper and lower pillars (not shown), carrying posts 48a, 48b, 48c and 48d. In any case, the etched parallel lines of lenticular screen 16 will run vertically.

Film holder 18 is comprised of a flat box 50 having a forwardly facing rectangular opening 52. Photographic film 54 (shown in phantom line) of the conventional instant-developing type is inserted into film holder 18 through a slot 56 provided in box 50, and the edges of the film are held by the film holder. It can readily be seen that rectangular opening 52 in box 50 allows a major central area of film 54 to be exposed to light which first passes through lenticular screen 16. The conventional film holder 18 is modified by attaching to the rear surface thereof a rotating locking handle 58 which may be inserted through a hole 60 centrally located in back member 20 as will be described further. It is noted that film 54 is inset slightly to the rear of the forward surface of film holder 18 and frame 48 protrudes rearwardly from pillars 44, 46 sufficiently to permit lenticular screen 16 to lay flat against film 54 in film holder 18. Further, while the vertical dimension of frame 48 is substantially equal to the vertical dimension of opening 52 in film holder 18, the horizontal dimension of frame 48 is slightly less than the horizontal opening 52 to thereby allow horizontal relative movement of frame 48 within opening 52.

Back member 20 includes at each corner thereof forwardly projecting film holder positioning blocks 62a, 62b, 62c, 62d at each corner thereof. While the bottom edge 22 between blocks 62c and 62d is provided with edge wall 64, the top 66 between blocks 62a and 62b is open to thereby permit access to slot 56 of film holder 18 when film holder 18 is captively retained within the confines of back member 20. When it is desired to utilize film holder 18 in the horizontal format (not shown), film holder 18 may be positioned between blocks 62a, 62b, 62c, 62d, and sidewall 68 retains film holder 18 within back member 20 while side surface 70 is open between blocks 62a and 62d to permit access to slot 56 of film holder 18. Attached to the forward wall 72 of back member 20 are four compression springs 74a, 74b, 74c and 74d, equally spaced around hole 60. Springs 74 act to urge film holder 18 and the associated film 54 therein against the rearward surface of lenticular screen 16. When placing film holder 18 into assembly 10 it is necessary to preliminarily counteract springs 74, and this is accomplished by means of locking handle 58 which is inserted through radially outwardly extending slots 60a of hole 60 and subsequent thereto, rotating handle 58 so that projections 58a on handle 58 lock against the rearward wall of back member 20, thereby preventing springs 74 from pushing film holder 18 and film 54 against lenticular screen 16. Assembly or kit 10 may be provided with a number of lenticular screen frames, each being of a different size and being of either vertical or horizontal rectangular format. It is necessary only that posts 48a, 48b 48c, 48d be positioned on frame 14 for mating engagement with bores 38a, 38b, 38c, 38d, respectively, of sliding frame 12. It will be the case in any event that the etched lines of lenticular screen 16 will extend vertically for the reasons described in the patents referred to hereinabove. It will be apparent that certain modifications may have to be made to back member 20 in order to accommodate film holders of dimensions different from that shown in the drawings.

OPERATION

After the initial modification of camera C is accomplished, i.e., sliding frame 12 is substituted within camera C and connected to the mechanical moving means incorporated within camera C as explained hereinabove, sliding frame 12 will be caused to move synchronousloy and in the same direction as the camera aperture as did the lenticular screen originally fitted within camera C.

Assume for the moment that it is desired to utilize camera C to produce three dimensional, instant-developing pictures from the conventionally sized Polaroid-type film holder 18 in the vertical format. Lenticular screen frame 14 is attached to sliding frame 12 in the manner described hereinabove, and back member 20 is hingedly attached to camera C as was also described hereinabove. Polaroid-film holder 18 as modified by the inclusion of rotating locking handle 58 is placed within the confines of blocks 62a, 62b, 62c, 62d of back member 20, and locking handle 58 is inserted through hole 60 and the associated slots 60a thereof in back member 20. Thereafter locking handle 58 is turned to lock film holder 18 onto back member 20 against the spring pressure of springs 74. Thereafter back member 20 is pivoted toward the rear of camera C and locked in position by means of securing locks 28a and 28b. A slide plate (not shown) is removed through slot 56 as it is no longer needed to protect the film from premature exposure to light. Rotating handle 58 is then rotated in such a manner as to pass projections 58a through slots 60a of hole 60 to permit springs 74a, 74b, 74c 74d to push film holder 18 with film 54 with even force against lenticular screen 16. The assembly is now ready to expose a three dimensional image on film 54. When camera C is actuated, the mechanical mechanism therein which originally moved a lenticular screen horizontally as light was permitted to enter the camera housing, now moves instead sliding frame 12 in a like manner. Sliding frame 12 will therefore horizontally shift lenticular screen frame 14 and lenticular frame 16 within opening 52 of film holder 18, while filmholder 18 and film 54 therein will be held stationary by back member 20. After exposure of film 54, it is developed in the conventional "instant-developing" manner, and when the finished product is viewed through a lenticular screen, the illusion of a three dimensional picture is created as described in the Law patents referred to hereinabove.

It can therefore be seen that a novel assembly or kit has been disclosed which may be attached in a facile manner to a known three dimensional camera and which improves upon the conventional lenticular screen type three dimensional camera by providing means which will permit greater versatility of the camera, in that it may thereafter be utilized with many different sized films in either the vertical or the horizontal format in a more convenient manner, and will be especially adapted to operate with Polaroid-type, instant-developing film.

Numerous modifications may be made to the preferred form of the invention as described hereinabove without departing from the spirit and scope thereof, for example; the means for connecting lenticular screen frame 14 to sliding frame 12 may be of any of numerous constructions other than posts 48a, 48b, 48c and 48d and bores 38a, 38b, 38c and 38d, such as mating VELCRO type pads; springs 74 may be leaf type springs instead of the coil springs shown in the drawing as long as the spring means are positioned to exert even pressure on film holder 18; and any type of attaching means may be utilized to attach back member 20 to camera C. It is therefore requested that the scope of the invention be defined only by the language of the following claims.

What is claimed is:

1. An improvement in a photographic camera for three dimensional photography having a housing including an opening to the interior on a forward side thereof for admitting light rays thereinto, means for projecting such light rays along an optical path to a location at the rearward side of such housing, and said camera including at the rearward side thereof mechanical means for moving a planar object in a direction parallel to the plane of said opening;

the improvement comprising: first frame means defining a rectangular opening attached to said mechanical movement means for movement therewith; second frame means removeably connected to said first frame means and defining a rectangular opening of lesser area than said opening of said first frame means; a lenticular screen extending across said opening of said second frame means; a back member attached to said housing for selective closure of said rearward side of said housing; said back member including film holder retainer means; a film holder including a framed opening adapted to hold photosensitive material; said film holder being held within said retainer means of said back member; and spring means for urging said film holder forwardly such that such photosensitive material is urged against said lenticular screen; whereby movement of said first frame means by said mechanical movement means causes corresponding movement of said lenticular screen with respect to such photosensitive material.

2. The improvement as specified in claim 1 and further characterized by:

said first frame means defining a substantially square opening and said second frame means defining a vertical format opening wherein the vertical dimension is greater than the horizontal dimension.

3. The improvement as specified in claim 1 and further characterized by:

said first frame means defining a substantially square opening and said second frame means defining a horizontal format opening wherein the horizontal dimension is greater than the vertical dimension.

4. The improvement as specified in claim 1 and further characterized by:

locking means on said film holder cooperating with said back member for permitting said film holder to be selectively held rearwardly in said back member retainer means in opposition to said spring means.

5. The improvement as specified in claim 4 and further characterized by:

said locking means includes an opening through said back member and a rotating locking handle on the rear surface of said film holder which protrudes through said opening and is selectively engaged with the rear surface of said back member.

6. The improvement as specified in claim 1 and further characterized by:

said framed opening in said film holder is rectangular having one dimension greater than the other dimension, and said back member retaining means permits said film holder to be inserted in said retaining means in either the vertical or horizontal format.

7. The improvement as specified in claim 1 and further characterized by:

said film holder is sized to utilize standard instant-developing film.

8. The improvement as specified in claim 1 and further characterized by:

said first frame means including a plurality of rearwardly facing bores, and a plurality of forwardly projecting posts on said second frame means located for insertion into and frictional engagement with respective ones of said rearwardly facing bores.

9. An improvement in a photographic camera for three dimensional photography having a housing including an opening to the interior on a forward side thereof for admitting light rays thereinto, means for projecting such light rays along an optical path to a location at the rearward side of such housing, and said camera including at the rearward side thereof mechanical means for moving a planar object in a direction parallel to the plane of said opening;

the improvement comprising: frame means defining a rectangular opening attached to said mechanical movement means for movement therewith; a lenticular screen held for movement with said frame means; a back member attached to said housing for selective closure of said rearward side of said housing; said back member including film holder retainer means; a film holder including a framed opening adapted to hold photosensitive material; said film holder being selectively held within said retainer means of said back menber; spring means for urging said film holder in a forward direction such that such photosensitive material is urged against said lenticular screen; and locking means for selectively holding said film holder rearwardly against said spring means until such time as said film holder is positioned adjacent said lenticular screen and said back member is in the closed position.

10. The improvement as specified in claim 9 and further characterized by:

said locking means includes an opening through said back member and a rotating locking handle on the rear surface of said film holder which protrudes through said opening and is selectively engaged with the rear surface of said back member.

11. The improvement as specified in claim 9 and further characterized by:

said framed opening in said film holder is rectangular having one dimension greater than the other dimension, and said back member retaining means permits said film holder to be inserted in said retaining means in either the vertical or horizontal format.

12. The improvement as specified in claim 9 and further characterized by:

said film holder is sized to utilize standard instant-developing film.

* * * * *